United States Patent
Garrido et al.

(10) Patent No.: US 6,464,297 B2
(45) Date of Patent: Oct. 15, 2002

(54) LOAD FLOOR SEAT ASSEMBLY

(75) Inventors: Pascal E. Garrido, Kilworthy; Andrew W. Guthrie, Brechin; Gregory J. Andrigo, Orillia; Keith C. Horsfield, Port Sydney, all of (CA)

(73) Assignee: Dura Global Technologies, Rochester Hills, MI (US)

( * ) Notice: Subject to any disclaimer, the term of this patent is extended or adjusted under 35 U.S.C. 154(b) by 0 days.

(21) Appl. No.: 09/728,255

(22) Filed: Dec. 1, 2000

(65) Prior Publication Data

US 2002/0067056 A1 Jun. 6, 2002

(51) Int. Cl.[7] .................................................. B60N 2/36
(52) U.S. Cl. .................. 297/354.13; 297/125; 297/126; 297/354.11; 297/362.11; 296/66
(58) Field of Search ................................. 297/125, 126, 297/354.11, 354.13, 362.11; 296/65.16, 65.17, 66, 69

(56) References Cited

U.S. PATENT DOCUMENTS

| | | | | |
|---|---|---|---|---|
| 74,910 A | * | 2/1868 | Golightly et al. ............. 297/57 |
| 1,383,262 A | * | 6/1921 | Deas ........................... 296/66 |
| 2,926,951 A | * | 3/1960 | Koplin ........................ 296/66 |
| 2,956,837 A | * | 10/1960 | Koplin ........................ 296/66 |
| 3,097,881 A | * | 7/1963 | Aquilar ....................... 296/66 |
| 3,171,682 A | * | 3/1965 | Buser et al. ................. 296/66 |
| 3,202,453 A | * | 8/1965 | Richards ..................... 296/66 |
| 3,227,488 A | * | 1/1966 | Kosbab et al. ............... 297/330 |
| 3,529,863 A | * | 9/1970 | Belfry ......................... 296/66 |
| 3,946,678 A | * | 3/1976 | Birge, II et al. ............. 108/44 |
| 4,005,898 A | * | 2/1977 | Way ............................. 296/174 |
| 4,366,983 A | * | 1/1983 | Klueting et al. ............ 297/362 |
| 4,428,611 A | * | 1/1984 | Widmer ....................... 296/66 |
| 4,469,375 A | * | 9/1984 | Boyer .......................... 297/362 |
| 5,718,479 A | * | 2/1998 | Rautenbach ............. 297/354.13 |
| 5,860,702 A | * | 1/1999 | Pilarczyk et al. ....... 297/354.13 |
| 6,082,805 A | | 7/2000 | Gray |
| 6,086,154 A | | 7/2000 | Mathey |
| 6,089,665 A | | 7/2000 | Andrigo |
| 6,092,873 A | | 7/2000 | Downey |
| 6,095,475 A | | 8/2000 | Willms |
| 6,109,584 A | | 8/2000 | Garrido |
| 6,139,105 A | | 10/2000 | Morgos |
| 6,196,613 B1 | * | 3/2001 | Arai ........................ 296/65.13 |

* cited by examiner

Primary Examiner—Peter M. Cuomo
Assistant Examiner—Joseph Edell
(74) Attorney, Agent, or Firm—Casimir R. Kiczek

(57) ABSTRACT

A load floor seat assembly for an adjustable seat is disclosed movable from a normal position to a load floor position. A seat base is adapted to be attached to a motor vehicle floor, at least one seat back arm is pivotably mounted to the seat base about a seat back pivot, and a seat back is pivotably attached to the seat back arm about a load floor pivot. A load floor assembly is attached to the seat back so that in the normal position the seat back is generally perpendicular to the seat base, and in the load floor position the seat back is generally parallel with the seat base and rotated about the load floor pivot, so that the load floor assembly covers the seat back and the seat base.

20 Claims, 11 Drawing Sheets

LOAD FLOOR SEAT ASSEMBLY

FIELD OF THE INVENTION

The present invention is directed to seat assemblies for motor vehicles, and more particularly to improvements in seat assemblies which accommodate a load floor for the motor vehicle.

BACKGROUND OF THE INVENTION

Seat assemblies have been commonly used in motor vehicles. In some motor vehicles, one, two and sometimes three rows of seats may be used. Such known seat assemblies take up space which, in some instances, would also be valuable as cargo space. Known methods of increasing cargo space simply have the seat assemblies (particularly the third row, when present) merely folded forward. Alternatively, the seat assemblies are releasably attached to a floor of the motor vehicle. Actuation of a latch disengages the seat assemblies, which are then manually picked up and carried out of the vehicle. The process must be repeated in reverse when it is desired to reattach the seat assembly to the floor of the motor vehicle.

There is a need for a seat assembly which can move out of the way so as to increase cargo space without the attendant complexity and awkwardness associated with the manual removal of heavy, bulky seats. There is also a need for a seat assembly which can be readily incorporated into the existing floor of a motor vehicle without requiring an excessively deep well to house the seat assembly, as that can cause noise issues.

In view of the foregoing, it is an object of the present invention to provide a seat assembly which is of simple construction and which is deployable between a normal seating position where the seat assembly performs the normal function of a seat and a second position where the seat drops into the floor and forms a structural component of the floor. It is an additional object of the present invention to provide a seat assembly that is highly reliable in operation and which can be manufactured efficiently. Additional objects and optional features of the invention will be apparent form the following disclosure and detailed discussion of preferred embodiments.

SUMMARY OF THE INVENTION

In accordance with a first aspect, a seat assembly is movable from a normal position to a load floor position and comprises a seat base adapted to be attached to a motor vehicle floor and having a first edge and a second edge, and a seat back pivotably attached to the seat base, where the seat base has a first edge and a second edge. A load floor assembly is attached to the seat back. In the normal position the first edge of the seat back is positioned generally adjacent the first edge of the seat base. In the load floor position the second edge of the seat back is positioned generally adjacent the seat base, and the load floor assembly covers the seat back and the seat base.

In accordance with another aspect, the seat assembly has a seat back arm pivotably mounted to the seat base about a seat back pivot and the seat back is pivotably attached to the seat back arm about a load floor pivot. In the normal position the seat back is generally perpendicular to the seat base. In the load floor position the seat back is generally parallel with the seat base and is rotated about 180 degrees about the load floor pivot, and the load floor assembly covers the seat back and the seat base.

In accordance with another aspect, the seat back of the seat assembly has a front side and a rear side, and the load floor assembly comprises a fixed floor panel attached to the rear side of the seat back and a slidable floor panel attached to the fixed floor panel. In the normal position the fixed panel covers the seat back and the slidable floor panel is retracted so that the seat base is uncovered. In the load floor position the sliding floor panel is extended beyond the fixed floor panel so that the seat base is covered by the sliding floor panel.

From the foregoing disclosure and the following more detailed description of various preferred embodiments, it will be apparent to those skilled in the art that the present invention provides a significant advance in the technology and art of seat assemblies. Particularly significant in this regard is the potential the invention affords for providing a seat which can deploy into the floor to increase cargo space without manual efforts associated with removal of the seat. Additional features and advantages of various preferred embodiments will be better understood in view of the detailed description provided below.

Figure 1:
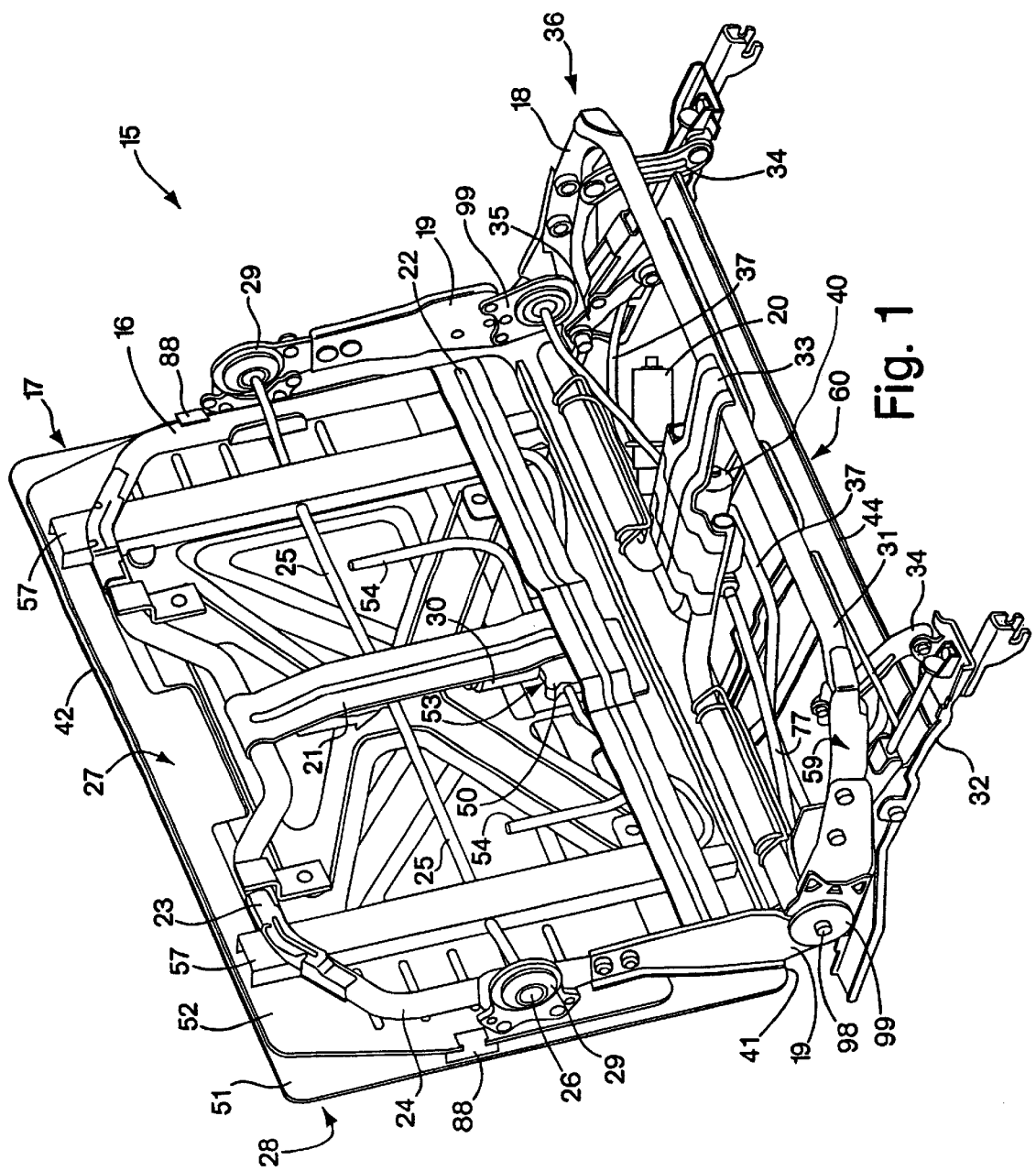
FIG. 1 is a perspective view of a preferred embodiment of a load floor seat assembly in accordance with a preferred embodiment, shown in a normal, seating position.

It should be understood that the appended drawings are not necessarily to scale, presenting a somewhat simplified representation of various preferred features illustrative of the basic principles of the invention. The specific design features of the seat assembly as disclosed here, including, for example, specific dimensions of the load floor will be determined in part by the particular intended application and use environment. Certain features of the illustrated embodiments have been enlarged or distorted relative to others to facilitate visualization and clear understanding. In particular, thin features may be thickened, for example, for clarity of illustration. All references to direction and position, unless otherwise indicated, refer to the orientation of the seat assembly illustrated in the drawings. In general, up or upward refers to the top of the paper in FIG. 1, forward refers to a leftward direction in the plane of the paper in FIGS. 3–10, and down or downward refers to a direction towards the bottom of the paper in FIG. 1.

DETAILED DESCRIPTION OF CERTAIN PREFERRED EMBODIMENTS

It will be apparent to those skilled in the art, that is, to those who have knowledge or experience in this area of technology, that many uses and design variations are possible for the load floor seat assemblies disclosed here. The following detailed discussion of various alternative and preferred features and embodiments will illustrate the general principles of the invention with reference to a seat assembly of a motor vehicle, particularly useful in minivans, sport utility vehicles and/or station wagons where increased cargo space is desired without attendant awkwardness associated with normal removal of a row of seats. Other embodiments suitable for other applications will be apparent to those skilled in the art given the benefit of this disclosure.

Turning now to the drawings, FIG. 1 shows a perspective view of a load floor seat assembly 15 in a normal, seating position, which has a seat back 16 having a front side 27, a rear side 28, a first edge 41, and a second edge 42 opposite the first edge 41. A seat base 18 is positioned below the seat back 16 and has a top side 59 and a bottom side 60 facing the vehicle floor, a first edge 43 and a second edge 44 opposite the first edge 43. The first edge 41 of the seat back 16 is seen in the normal position to be generally adjacent the first edge of the seat base 18. Of course the seat assembly 15 would normally have foam and fabric material forming seat cushions covering the seat back and seat base. The seat back 16 is connected to the seat base by seat back arms 19 and a pivotable recliner assembly, shown here as a pair of recliners 99, one on each side of the load floor seat assembly. Approximately half way up side sections 24 of the seat back 16 the arms 19 end and another pair of pivotable recliners 29 are positioned which connect the seat back 16 to the arms 19. The recliners 29 permit the seat back to pivot about a load floor pivot 26, as discussed in greater detail below. Preferably the recliners 29 and 99 are taumel recliners so as to be continuously locked when not adjusted. Other recliner mechanisms which generally hold the seat back and seat base with respect to the seat back arm but which permit adjustment of these components with respect to one another will be readily apparent to those skilled in the art given the benefit of this disclosure.

Figure 2:
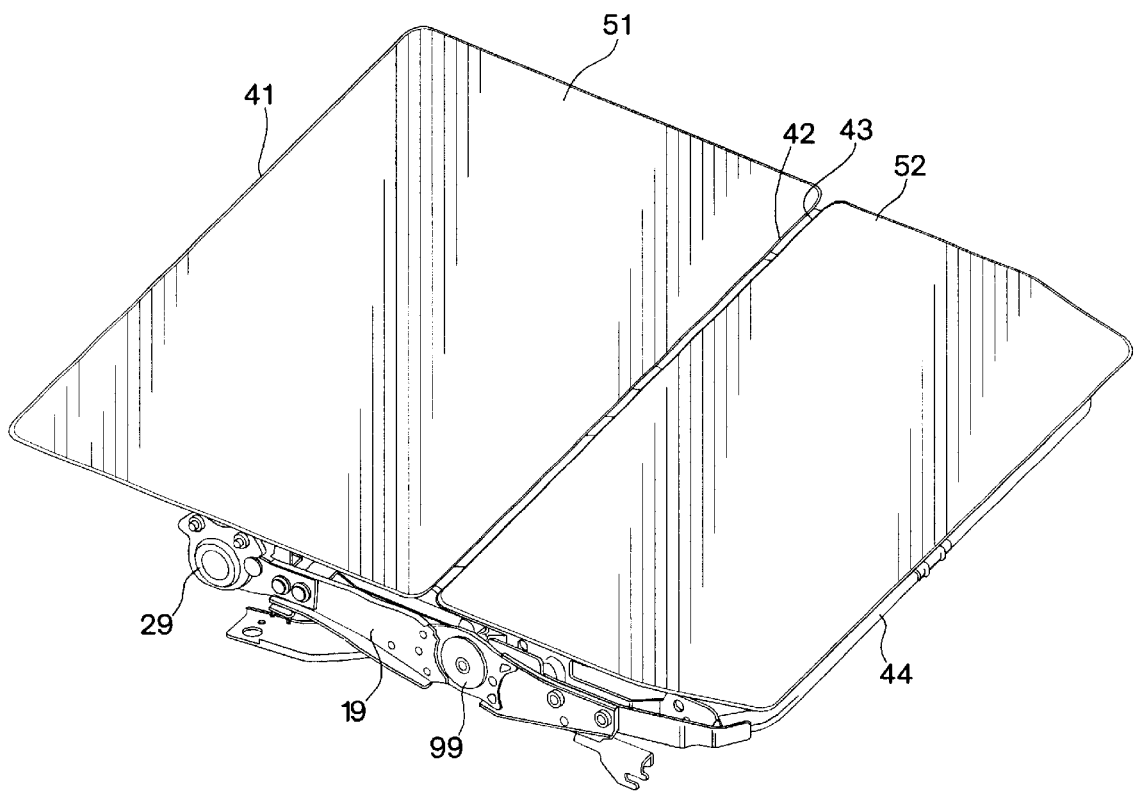
FIG. 2 is a perspective view of the seat assembly of FIG. 1, shown in a load floor position with the load floor deployed.

The load floor seat assembly 15 has a load floor assembly 17 attached to the rear side of seat back 16, and comprises a fixed load floor panel 51 and a slidable load floor panel 52 positioned in front of the fixed panel 51. The seat back 16 has a top section 23, a bottom section 22, and these sections are connected by side sections 24 and by center section 21. In accordance with a highly advantageous feature, in the normal position the slidable panel 52 is positioned behind the seat back 16, and in a load floor position (FIG. 2) the slidable panel is deployed to cover the seat base 18. That is, the load floor assembly 17 forms a floor, increasing valuable cargo space in a motor vehicle without being forced to manually remove a seat.

Figure 5:
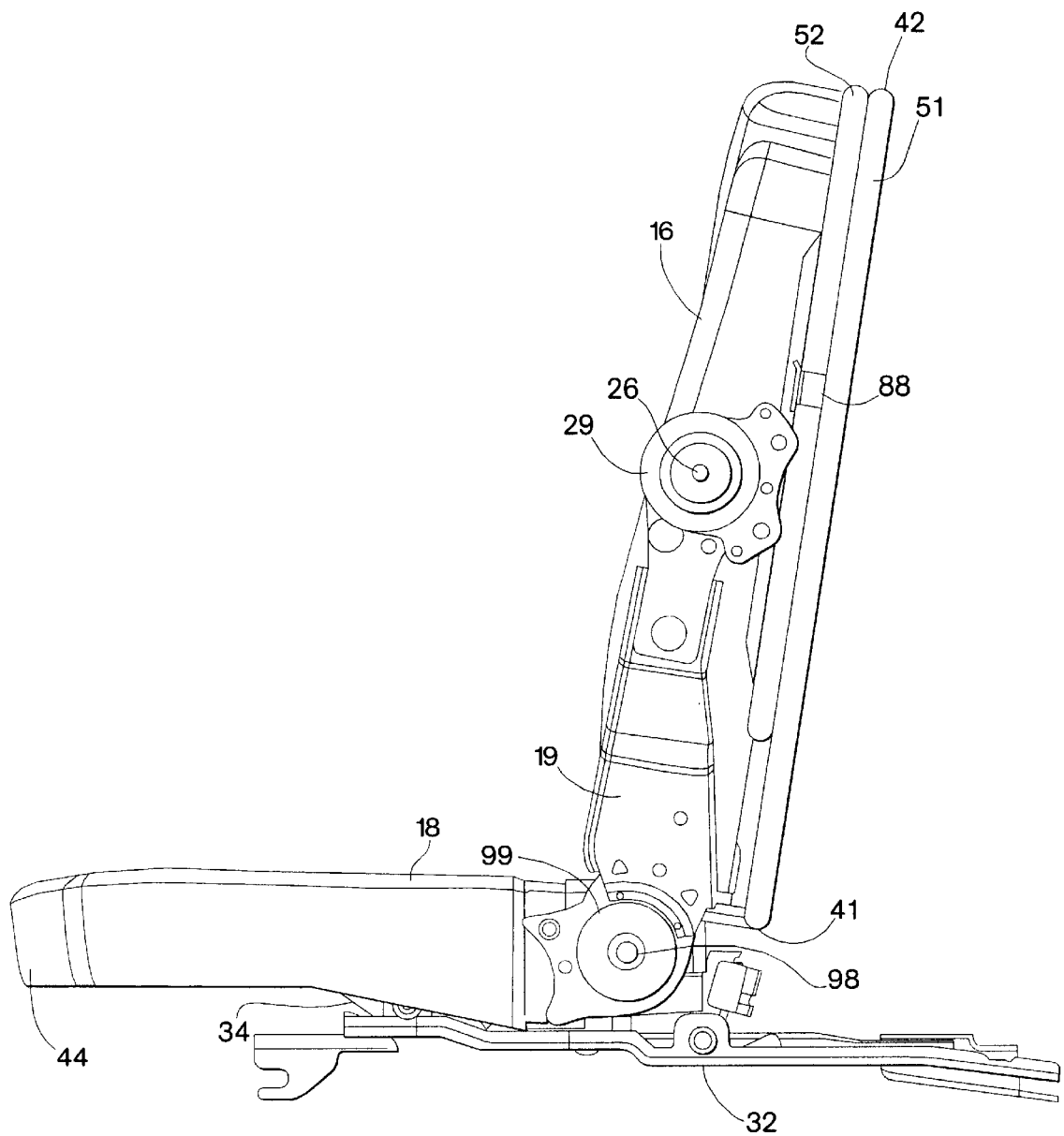
FIG. 5 is a side view of a second intermediate position where a seat base of the seat assembly has moved forward and down.
Figure 6:
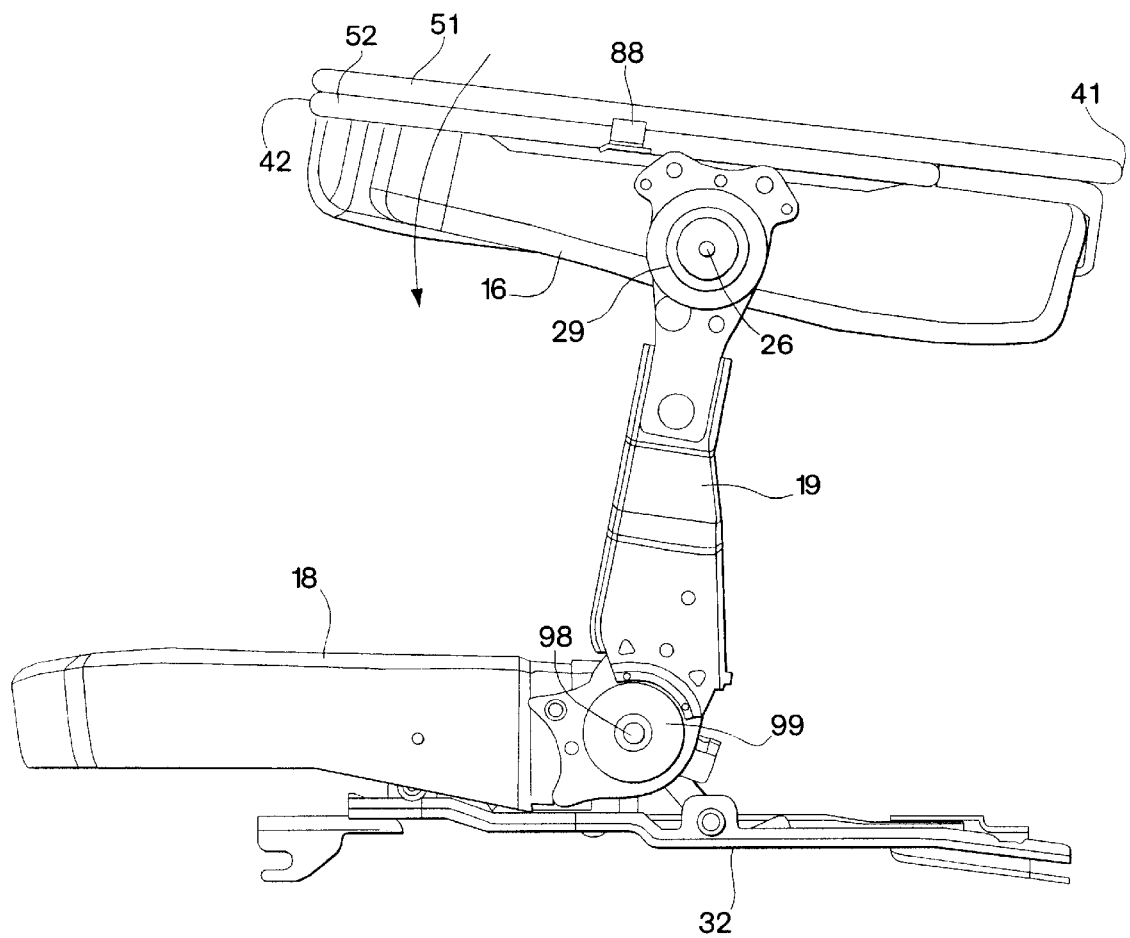
FIG. 6 is a side view of a third intermediate position where the seat back is rotated.
Figure 7:
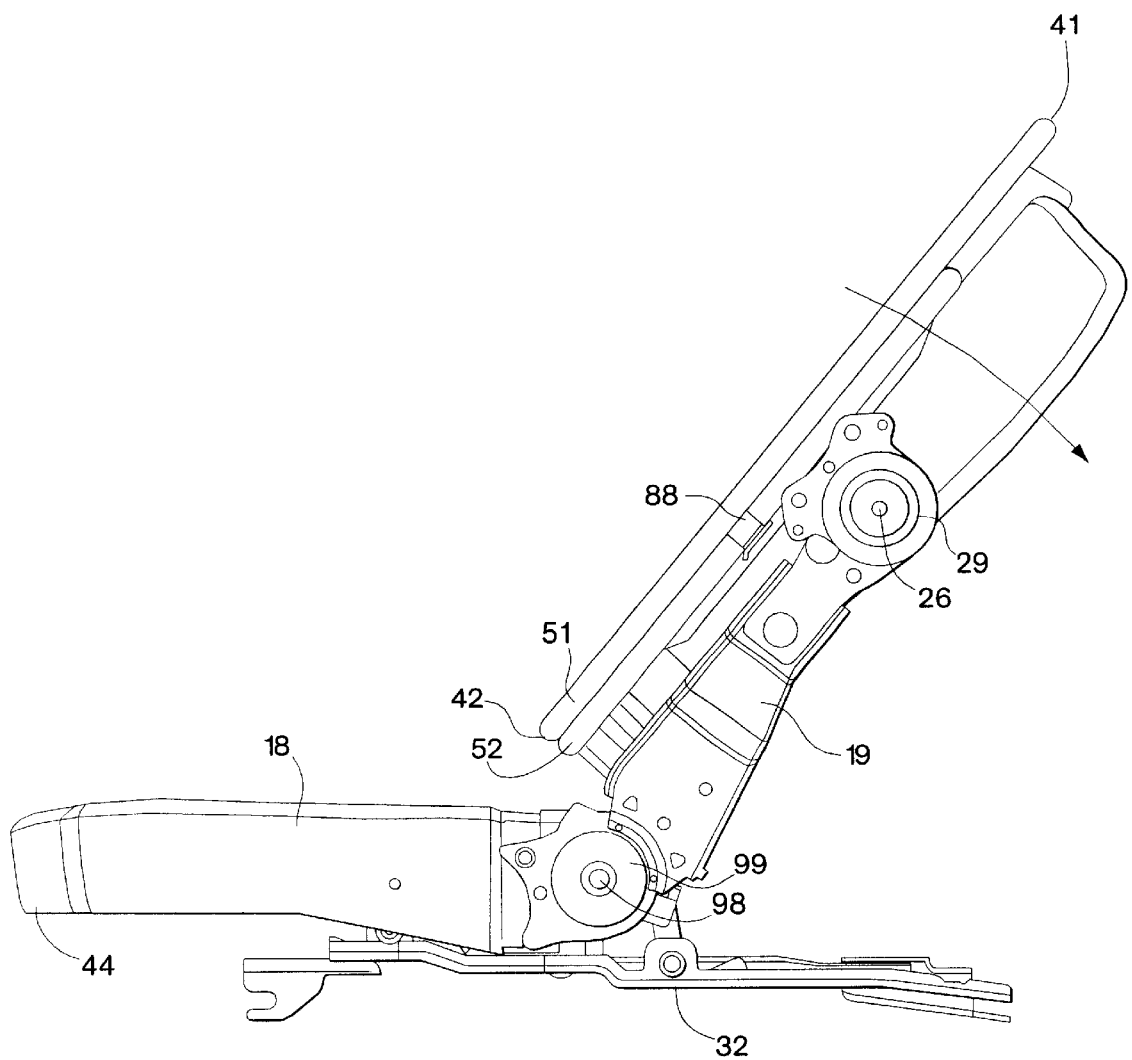
FIG. 7 is a side view of a fourth intermediate position where the seat back has completed rotation with respect to the seat back arms, and now is folded down toward the floor.
Figure 8:
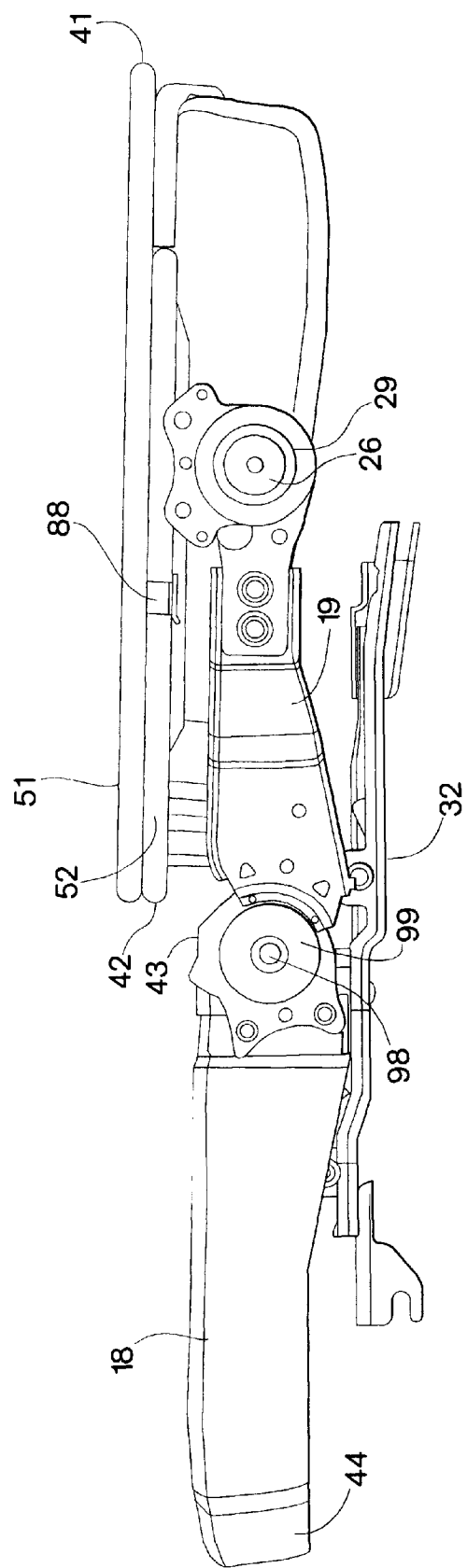
FIG. 8 is a side view of a fifth intermediate position where the seat back has reached the floor but the load floor has not deployed.

A series of motors are used to drive the various components of the load floor seat assembly 15 between the normal position and the load floor position. Due to power constraints in the vehicle and the need to avoid the various components from interfering with one another's motion as the load floor seat assembly moves from the normal seating position to the load floor position, it is preferable to sequence the operation of the various motors. FIGS. 3–10 show one preferred order of actuation of such motors. First motor 20 drives the seat base 18 between a first position (FIG. 3) to a second position (FIG. 5) forward of the first position. Next, as seen in FIG. 6, second motor 30 rotates the seat back about pivot axis 26 about 180 degrees. Then, as seen in FIGS. 7–8, third motor 40 rotates the seat back arms 19 with respect to the seat base 18 about pivot axis 98 so that the seat back 16 is generally parallel with the seat base. In the final stage, fourth motor 50 deploys the sliding panel 52 to cover the seat base 18. Other sequences for actuation of the motors 20, 30, 40, and 50 will be readily apparent to those skilled in the art, given the benefit of this disclosure. Also, one motor could be used to drive more than one component of the load floor seat assembly.

Figure 3:
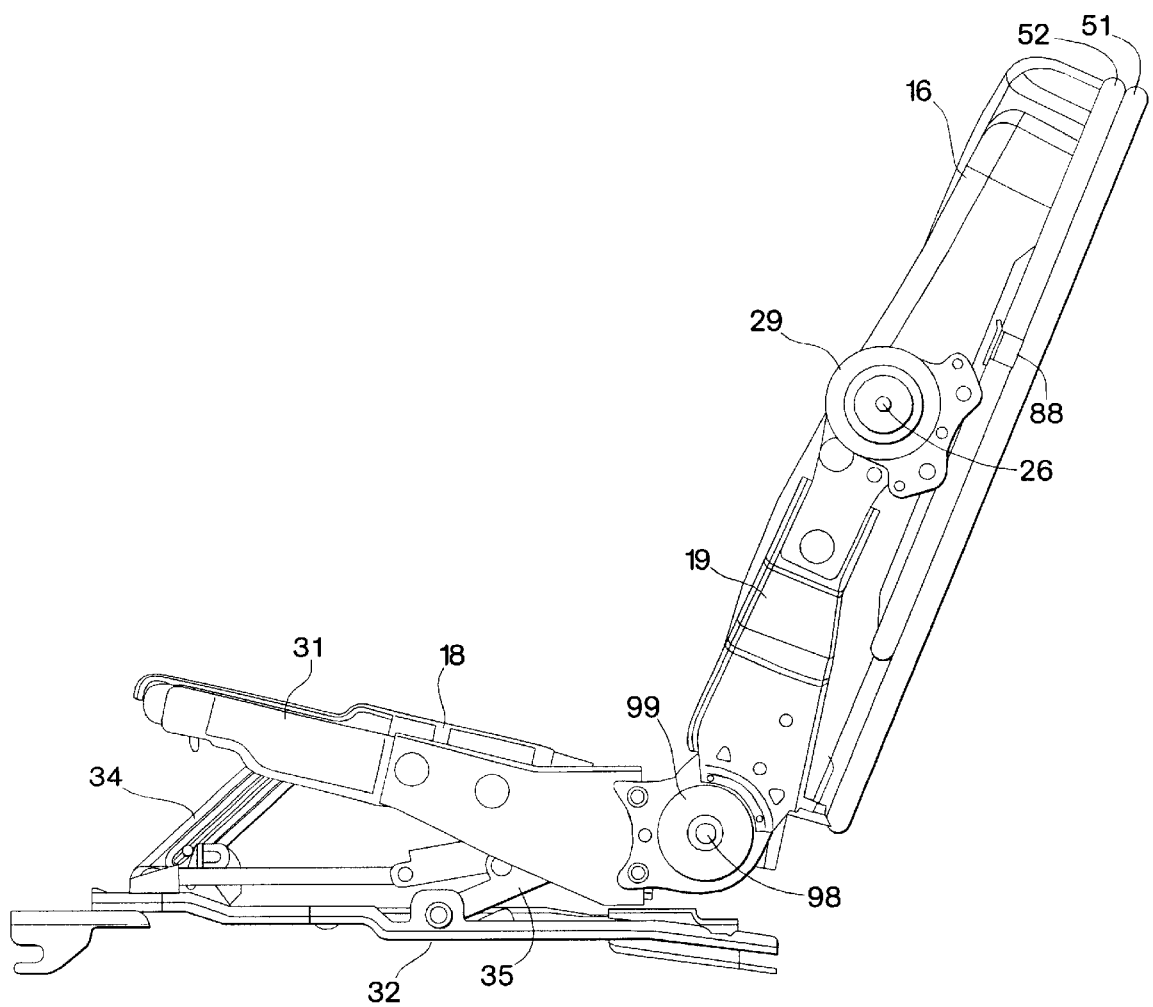
FIG. 3 is a side view of the seat assembly of FIG. 1 in the normal, seating position.
Figure 4:
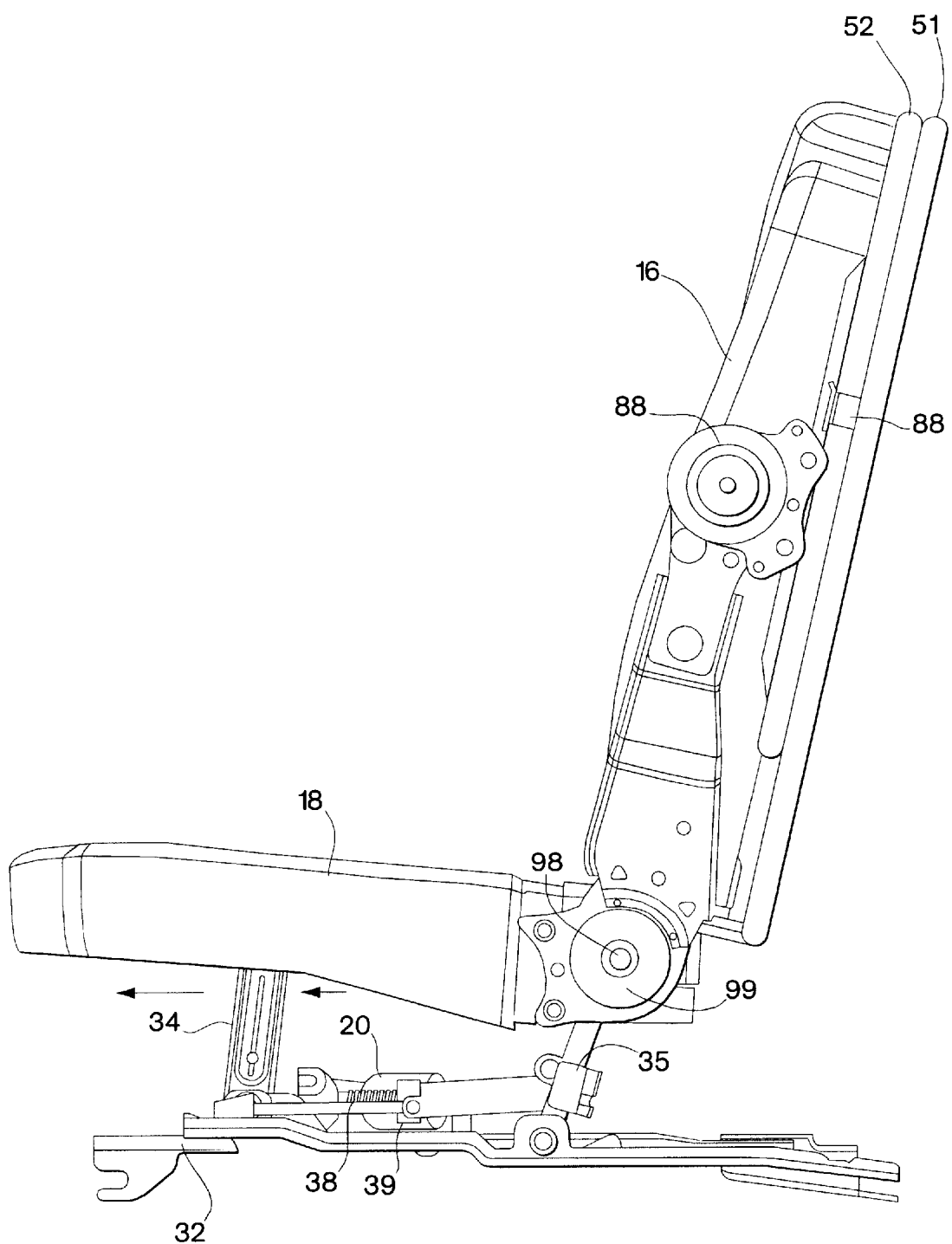
FIG. 4 is a side view of a first intermediate position where a seat base of the seat assembly has moved forward.

Turning now to the operation of the various segments of the load floor seat assembly 15 in more detail, FIGS. 1, 3 and 4 show the drive assembly for moving the seat base 18 between the first and second positions. The seat base 18 has a seat base frame 31 pivotably connected to a floor mount 32 by a front link 34 and a rear link 35, forming, in effect, a 4-bar linkage assembly. First motor 20 is preferably mounted to the seat base frame 31 near center section 33. At least one drive nut 39 is attached to the seat base 18 which is movable by a corresponding drive screw 38 connected to the drive motor 20 by flexible drive transmission shafts 37, or flex shafts. Thus, rotation of the first motor 20 causes the flex shafts 37 to transmit rotational force to drive screws 38, (each positioned generally adjacent side sections of the seat base frame 31) and rotation of the drive screws moves the corresponding nut 39 with respect to the drive screw. Since the nut is attached to the seat base, the seat base moves with the drive nut between the first position (shown in FIGS. 1 and 3) to an intermediate position (FIG. 4), to the second position where the seat base position in the motor vehicle will have dropped somewhat (FIG. 5). It will be readily apparent to those skilled in the art given the benefit of this disclosure that it is possible within the scope of this invention to position the drive motor 20 in a variety of locations, that the flex shafts may be of uneven length, or that only one flex shaft/drive screw/nut combination may be used.

Turning now to the seat back, FIGS. 1 and 5–7 best show the components and motion of the seat back 16. Preferably, after the seat base has moved the seat back 16 is then moved. Second drive motor 30 is shown mounted to the center section 21 of the seat back. Additional seat back supports 57 may be provided for structural stability. Also, in the preferred embodiment shown in the drawings some of the drive mechanism for moving the sliding load floor panel 52 can be positioned behind the supports 57.

Flex shafts 25 connect the motor to recliners 29 and transmit rotational force from the motor 30 in a manner analogous to the transmission of rotational force via flex shafts 37 from motor 20. The recliners 29 turn the entire seat back (including the load floor assembly 17) approximately 180 degrees with respect to the seat back arms 19, which remain rigidly attached to the seat base 18 during this maneuver. In the preferred embodiment shown in the drawings, the seat back 16 is rotated about 179.2 degrees with respect to the seat back arm. As mentioned above, in the normal position the first edge 41 of the seat back 16 is generally adjacent the first edge of the seat base 18. The rotation of the seat back 16 causes the second edge 42 of the seat back 16 to be positioned generally adjacent the first edge 43 of the seat base 18 as shown in FIG. 7.

FIGS. 1, 7 and 8 show the next step wherein a third motor 40 moves the seat back arms 19 with respect to the seat base 18 between first and second positions. Motor 40 is mounted preferably adjacent motor 20 on the center section of the seat base frame 31. Flex shafts 77 connect the third motor 40 to recliners 99, and operation of the motor urges the seat back arms 19 to pivot down and away from the seat base 18 until the seat back 16 reaches a position generally parallel with the seat base, as shown in FIG. 8.

Figure 9:
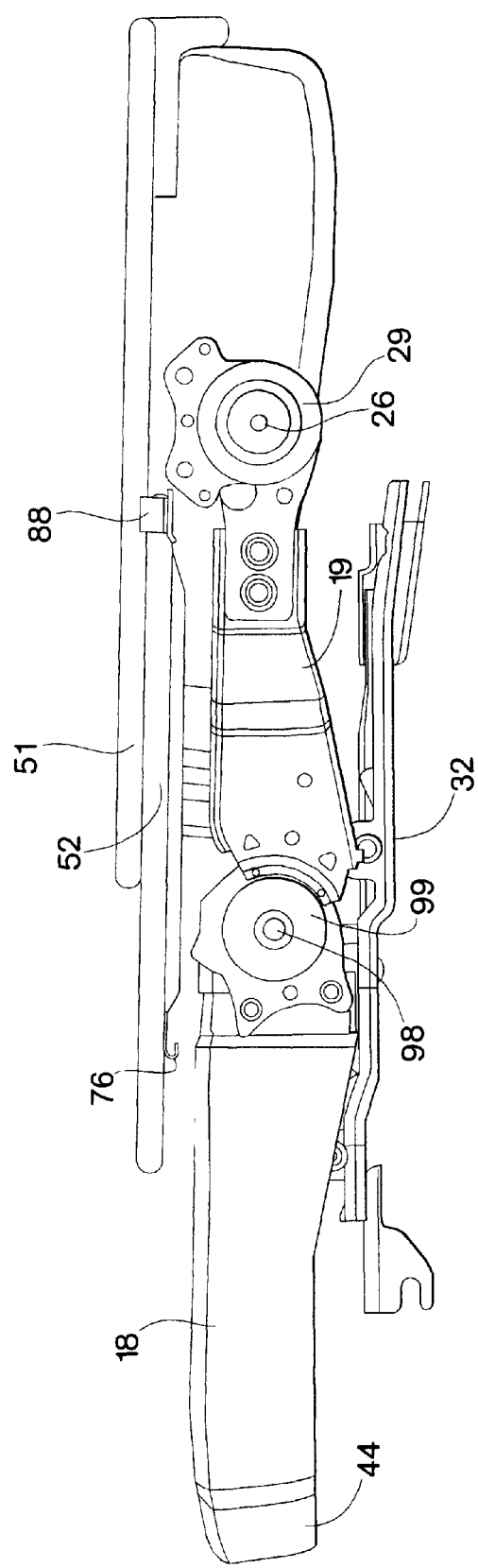
FIG. 9 is a side view showing the load floor partially deployed.
Figure 10:
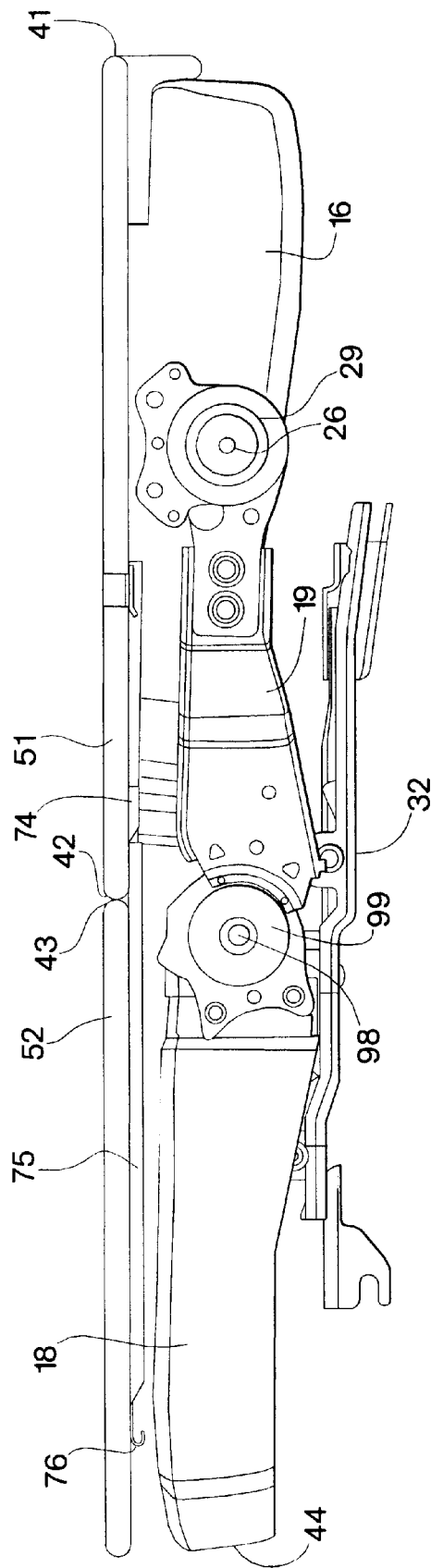
FIG. 10 is a side view showing the load floor completely deployed so that the seat assembly is in the load floor position of FIG. 2.
Figure 11:
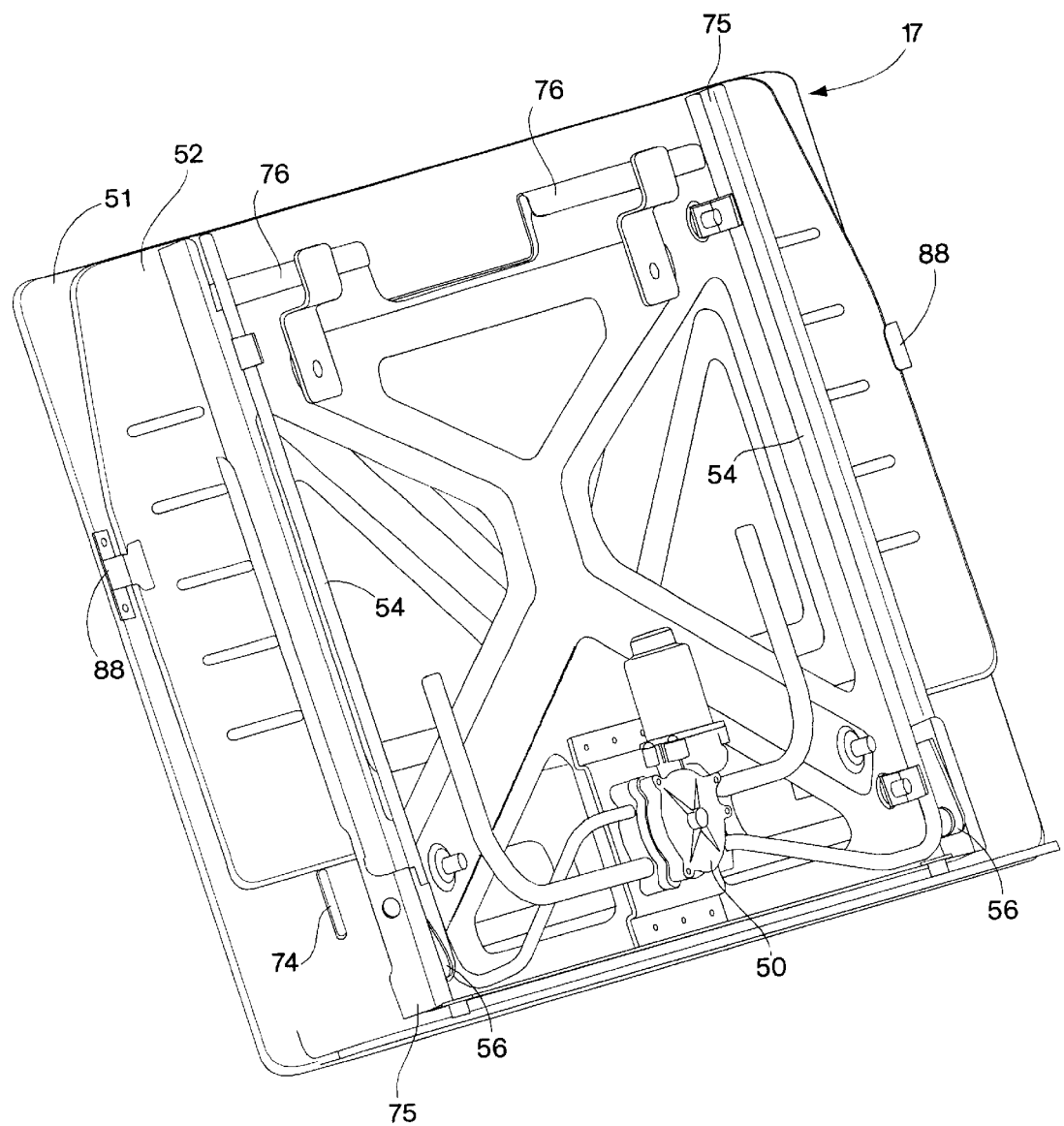
FIG. 11 is a back side view of the load floor assembly in accordance with a preferred embodiment, with the seat back removed for clarity of illustration.

FIGS. 9–11 show the load floor assembly 17 and how it deploys to complete the movement of the load floor seat assembly to the load floor position. Fourth motor 50, preferably mounted on the fixed load floor panel 51 imparts rotational force to a drive mechanism which drives the slidable load floor panel 52 between its stowed position and deployed position via attachment brackets 56. Guide channels 75 extend beyond a lower edge of the sliding load floor panel 52, and provide stability during the adjustment operation of the sliding load floor panel. The drive mechanism as shown here can be, for example, a flocked spring positioned in channels 54. Other drive mechanisms suitable for deploying the sliding panel, including tape drive systems and pull-pull cable systems, will be readily apparent to those skilled in the art given the benefit of this disclosure.

The fixed load floor panel 51 is held against the sliding load floor panel 52 by catches 88 before the sliding load floor panel is deployed. Once drive motor 50 moves the sliding load floor panel 52 past catch 88 and past the fixed load floor panel 51, the fixed load floor panel is free to drop down so as to be generally flush or co-planar with the sliding load floor panel, as seen in FIG. 10.

The fixed load floor panel 51 needs to be moved back up to allow the sliding load floor panel to return from the deployed, load floor position to the stowed position. This is accomplished in that a portion of the sliding floor panel contacts ribs 74 extending from the fixed load floor panel as the sliding load floor panel begins to leave the extended position and return to the normal position. This immediately guides the fixed load floor panel 51 up over the sliding load floor panel 52, as the sliding panel moves through the catches 88 and back to the normal, stowed position. Optionally the ribs 74 may be ramped to help guide the sliding floor panel down behind the fixed load floor panel. Hook 76 on panel 52 can lock the sliding panel onto a portion of the seat back frame, reducing rattle.

It will be understood that the concept of the floor panels covering the seat back and seat base as used herein, refers the ability of the floor panels to form a floor over the seat back and seat base. It will be readily understood that the seat back and seat base need not be entirely covered for the floor panels to readily form a floor. Moreover, more than one fixed panel and more than one sliding panel may be used to cover the seat back and seat base.

Advantageously, the entire movement may be accomplished simply by having an operator actuate a switch or a button. Further, the process may be reversed through an equally simple process. The invention saves significant labor which heretofore would have been required to remove a row of seats.

From the foregoing disclosure and detailed description of certain preferred embodiments, it will be apparent that various modifications, additions and other alternative embodiments are possible without departing from the true scope and spirit of the invention. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A load floor seat assembly movable from a normal position to a load floor position, comprising, in combination:
   a seat base adapted to be attached to a motor vehicle floor;
   at least one seat back arm pivotably mounted to the seat base about a seat back pivot, and a seat back pivotably attached to the seat back arm about a load floor pivot; and
   a load floor assembly attached to the seat back;
   wherein in the normal position the seat back is generally perpendicular to the seat base, and in the load floor position the seat back is generally parallel with the seat base and rotated about 180 degrees about the load floor pivot, and the load floor assembly slidably covers the seat back and the seat base.

2. The load floor seat assembly of claim 1 wherein the seat back has a front side and a back side, and the load floor assembly is attached to the back side of the seat back.

3. The load floor seat assembly of claim 1 wherein the seat back pivots around the seat back pivots about 80 degrees as the load floor assembly moves from the normal position to the load floor position.

4. The load floor seat assembly of claim 1 wherein the load floor assembly comprises a fixed floor panel attached to the fixed floor panel and a slidable floor panel attached to the fixed floor panel, and further comprising a drive assembly for moving the sliding panel between a retracted and an extended position.

5. The load floor seat assembly of claim 4 wherein the slidable floor panel in the extended position is substantially flush with the fixed floor panel.

6. A load floor seat assembly movable from a normal position to a load floor position, comprising, in combination:
   a seat base adapted to be attached to a motor vehicle floor, and a seat back pivotably attached to the seat base, the seat back having a front side and a rear side; and
   a load floor assembly comprising a fixed floor panel attached to the rear side of the seat back and a slidable floor panel attached to the fixed floor panel;
   wherein in the normal position the fixed floor panel covers the seat back and the slidable floor panel is retracted so that the seat base is uncovered, and in the load floor position the slidable floor panel is extended beyond the fixed floor panel so that the seat base is covered by the slidable floor panel.

7. The load floor seat assembly of claim 6 wherein the seat base is driven by a first motor between a first position when the load floor assembly is in the normal position, and a second position with respect to the seat back arm when the load floor assembly is in the load floor position.

8. The load floor seat assembly of claim 7 further comprising a seat back arm pivotably connected to the seat back and to the seat base, wherein the seat back is driven by a second motor between a first position with respect to the seat back arm when the load floor assembly is in the normal position, and a second position with respect to the seat back arm when the load floor assembly is in the load floor position.

9. The load floor seat assembly of claim 8 wherein the seat back arm is moved by a third motor between a first position with respect to the seat base when the load floor assembly is in the normal position, and a second position with respect to the seat base when the load floor assembly is in the load floor position.

10. The load floor seat assembly of claim 9 wherein the sliding panel is driven by a fourth motor between the retracted position and the extended position.

11. The load floor seat assembly of claim 6 further comprising at least one seat back arm connected to the seat base by a first taumel recliner, permitting the at least one seat back arm to pivot with respect to the seat back, and the at least one seat back arm is connected to the seat back by a second taumel recliner, permitting the seat back to pivot with respect to the at least one seat back arm.

12. The load floor seat assembly of claim 11 further comprising a drive assembly for rotating the first taumel recliner, the drive assembly comprising a drive mounted on the seat base and a flex shaft connecting the drive motor to the first taumel recliner, and a drive assembly for rotating the second taumel recliner comprising a drive motor mounted on the seat back and a flex shaft connecting the drive motor to the second taumel recliner.

13. The load floor seat assembly of claim 6 wherein the seat base has a top side and a bottom side, and in the normal position the top side of the seat base faces generally upward, and in the load floor position the rear side of the seat back faces generally upward.

14. A load floor seat assembly adapted for use with a motor vehicle floor, comprising, in combination:
   a seat base adjacent to a motor vehicle floor, the seat base including:
      a frame;
      a floor mount adjacent to the frame;
      a first link pivotably connected to the floor mount and pivotably connected to the frame; and
      a second link pivotably connected to the floor mount and pivotably connected to the frame;
      wherein the frame translates with respect to the floor mount as the load floor seat assembly moves between a normal position and a load floor position;
   at least one seat back arm pivotably mounted to the seat base;
   a seat back pivotably attached to the seat back arm; and
   a load floor assembly attached to the seat back, the load floor assembly having a fixed floor panel attached to the seat back, a slidable floor panel attached to the fixed floor panel and a drive assembly for moving the sliding panel between a retracted and an extended position so that in the extended position the slidable panel covers a portion of the seat base when the load floor seat assembly is in the load floor position.

15. The load floor seat assembly of claim 14 wherein the seat base having a first edge and further comprising at least one seat back arm and at least one recliner assembly pivotably connecting the seat back arm to the seat base generally adjacent the first edge of the seat base.

16. The load floor seat assembly of claim 14 wherein when the load floor assembly is in the load floor position, the slidable floor panel is generally coplanar with the fixed floor panel.

17. The load floor seat assembly of claim 14 further comprising:
   a drive screw adjacent to the floor mount;
   a drive nut adjacent to the frame; and
   a drive motor urging the drive screw to rotate, which in turn translates the drive nut and moves the seat base frame with respect to the floor mount as the load floor assembly moves from the normal position to the load floor position.

18. A load floor seat assembly adapted for use with a motor vehicle floor, comprising, in combination:
   a seat base adjacent to the motor vehicle floor;
   a seat back adjacent to the seat base, the seat back having a panel member;
   means for moving connected to the seat base and the seat back wherein the seat back moves relative to the seat base between a normal condition and a load floor condition; and
   means for sliding the panel member between a retracted condition wherein the seat base is uncovered and an extended condition wherein the panel member covers a portion of the seat back and the seat base.

19. The load floor seat assembly of claim 18 wherein the seat base further having portions forming a four bar linkage.

20. The load floor seat assembly of claim 18 wherein the seat base having a first edge and a second edge spaced away from the first edge of the seat base, the seat back being pivotably connected to the seat base, the seat back having a first edge and a second edge in spaced relation to the first edge of the seat back, wherein in the normal condition, the first edge of the seat back is positioned generally adjacent to the first edge of the seat base, and in the load floor condition, the second edge of the seat back is positioned generally adjacent to the first edge of the seat back, and the panel member in the extended condition forms a floor over the seat back and seat base.

* * * * *